US007229264B2

(12) United States Patent
Crooks

(10) Patent No.: US 7,229,264 B2
(45) Date of Patent: Jun. 12, 2007

(54) PLATEN WITH SELF-CLEANING EXHAUST HOLES AND MULTI-OPENING PRESS UTILIZING SAME

(76) Inventor: Wayne Crooks, 1649 Heather Rd., Madison, OH (US) 44057

(*) Notice: Subject to any disclaimer, the term of this patent is extended or adjusted under 35 U.S.C. 154(b) by 337 days.

(21) Appl. No.: 10/900,746

(22) Filed: Jul. 28, 2004

(65) Prior Publication Data

US 2006/0024400 A1 Feb. 2, 2006

(51) Int. Cl.
*B29C 33/10* (2006.01)
*B29C 33/72* (2006.01)

(52) U.S. Cl. .................... 425/80.1; 425/234; 425/338; 425/344; 425/406; 264/125; 100/111; 100/113; 100/194

(58) Field of Classification Search ...... 425/80.1–83.1, 425/233–234, 338–339, 344, 406; 264/109–128; 100/109–116, 126–127, 193–195
See application file for complete search history.

(56) References Cited

U.S. PATENT DOCUMENTS

| | | | | |
|---|---|---|---|---|
| 1,656,523 | A | 1/1928 | Kornsweet | |
| 2,181,737 | A | 11/1939 | North | |
| 2,398,135 | A | 4/1946 | De La Roza, Sr. | |
| 2,811,996 | A | 11/1957 | Castellanos | |
| 4,255,109 | A | 3/1981 | Emmerich et al. | |
| 4,405,457 | A | 9/1983 | Busse et al. | |
| 4,413,554 | A | 11/1983 | Wallander | |
| 4,705,055 | A | 11/1987 | Rohm et al. | |
| 4,857,135 | A * | 8/1989 | Copp | 425/338 |
| 4,874,308 | A * | 10/1989 | Atlas et al. | 425/544 |
| 4,895,508 | A | 1/1990 | Held | |
| 4,923,656 | A | 5/1990 | Held | |
| 5,176,073 | A | 1/1993 | Dressel | |
| 5,185,114 | A | 2/1993 | Held | |
| 5,462,425 | A | 10/1995 | Kuss et al. | |
| 5,513,562 | A | 5/1996 | Moor | |
| 5,750,160 | A * | 5/1998 | Weber et al. | 425/290 |
| 5,791,237 | A | 8/1998 | Gibson | |
| 5,875,707 | A | 3/1999 | Rajala | |
| 6,123,018 | A | 9/2000 | Wettlaufer et al. | |
| 6,360,655 | B1 | 3/2002 | Crespo Barrio | |
| 6,451,213 | B2 | 9/2002 | Huebner | |
| 6,520,073 | B1 | 2/2003 | Sorensen | |
| 6,530,764 | B2 | 3/2003 | Mishima et al. | |
| 6,668,713 | B2 * | 12/2003 | Vomberg | 100/195 |
| 6,668,714 | B2 | 12/2003 | Wollny et al. | |
| 6,923,629 | B2 * | 8/2005 | Ahn et al. | 425/812 |
| 2003/0066440 | A1 | 4/2003 | Vomberg | |

* cited by examiner

*Primary Examiner*—Yogendra N. Gupta
*Assistant Examiner*—Thu Khanh T. Nguyen
(74) *Attorney, Agent, or Firm*—Pearne & Gordon LLP

(57) ABSTRACT

A platen press for pressing loose wood-based material into structural panels at high temperature while exhausting steam generated in the process through vents distributed across the face of a platen to thereby produce an improved product. The vents are periodically cleaned to remove elements of the panel material that have been deposited into the vents with steam flow or mechanical pressure by pins carried within the platen. The pins are positively extended into respective vents by actuating elements housed within the thickness of the body of the platen.

22 Claims, 8 Drawing Sheets

PLATEN WITH SELF-CLEANING EXHAUST HOLES AND MULTI-OPENING PRESS UTILIZING SAME

BACKGROUND OF THE INVENTION

The invention relates to improvements in press platens for manufacture of structural panels.

PRIOR ART

It is known, for example, from U.S. Pat. No. 6,668,714 to manufacture plywood, chipboard, particle board, oriented strand board and like panels by pressing layers, chips, particles and/or strands in loose, matte or cake-like form with adhesive binder resin between flat platens. Commercial production typically involves a multi-stage platen press in which numerous horizontally oriented platens are arranged one above another and are simultaneously pressed together to form a plurality of boards in a single pressing cycle. This referenced publication recognizes the problem of particles of the board material clogging vent holes in the faces of the platens and proposes the technique of exhausting high pressure steam or other gas through the vents to purge them of residual board material. Such a technique has limited effectiveness because the gas pressure/flow may not be sufficient to dislodge the particles or resin. Successive deposits of resin each with sufficient adherence to the preceding layer to stay in place when impinged by gas pressure/flow can accumulate to eventually plug a vent.

SUMMARY OF THE INVENTION

The invention provides a platen suitable for a multistage press that has vents distributed across its surface for exhausting steam and other vapors, expelled from wood-based material being pressed and heated, and mechanical elements for self-cleaning the vents. The mechanical elements include a pin associated with each vent hole in the pressing surface. The pins and elements that operate the pins within the boundary of the pressing surface are contained exclusively within the body of the platen.

In the disclosed embodiments, the platen pressing surfaces are rectangular and the vent holes and associated cleaning pins are spaced from one another along parallel spaced lines perpendicular to the major edges of the platen. The pins are movable from a retracted position where they allow free flow of vapor into the associated vent holes and an extended position where they occupy the space of the vent holes so as to positively displace any foreign material from the vent holes. The pins are forcibly mechanically extended from retracted positions by cam elements disposed in a passage common to all of the vents lying along the same perpendicular or transverse line. The cam elements in a common passage are all actuated simultaneously by mechanical forces transmitted along the passage. The pins are each returned to their retracted position by an associated compression spring. The common passage housing the cam elements also serves as a manifold for collecting and discharging vapor received by the individual vent holes.

DESCRIPTION OF THE PREFERRED EMBODIMENTS

Figure 1:
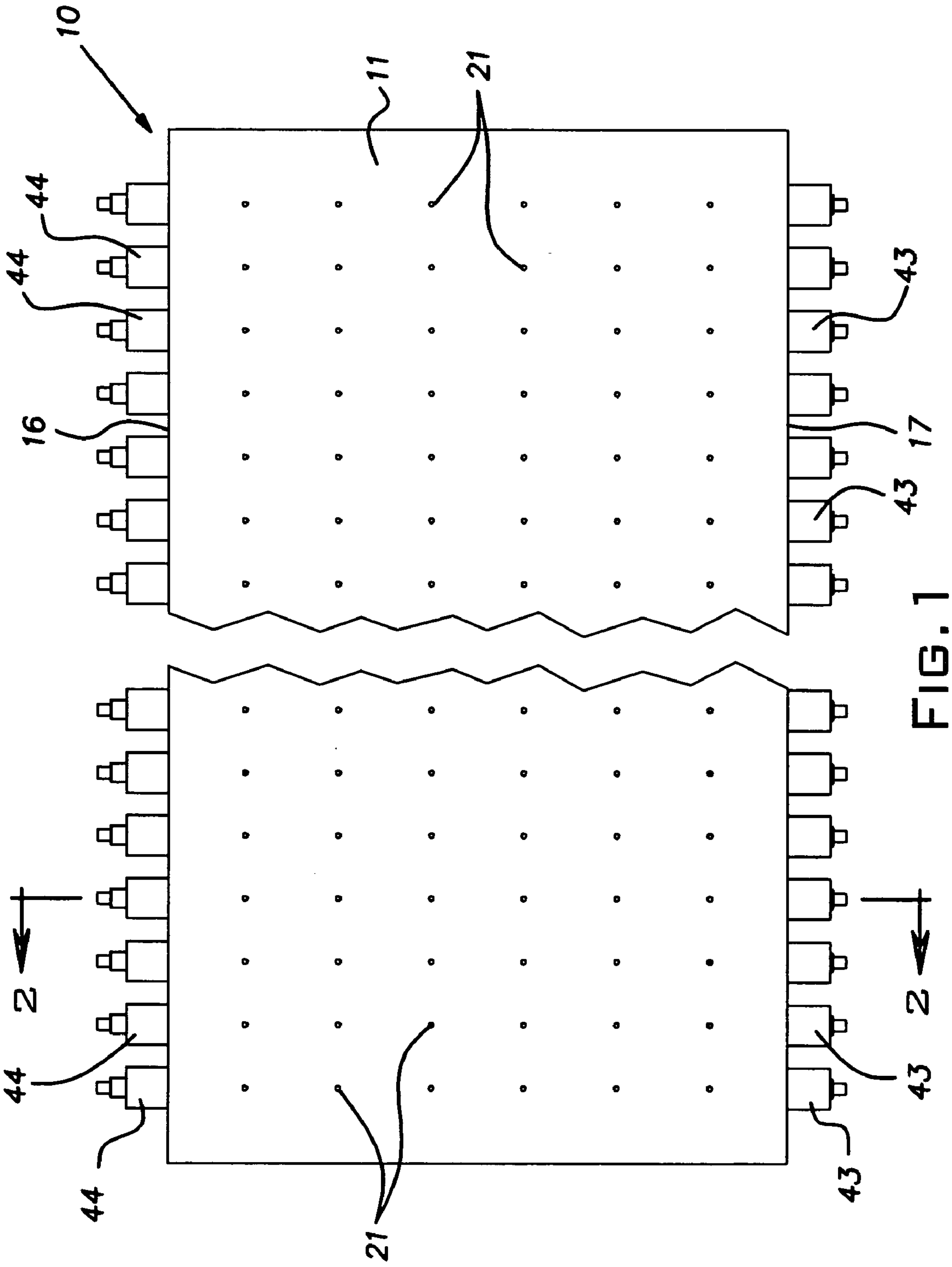
FIG. 1 is a somewhat simplified plan view of a platen constructed in accordance with a first embodiment of the present invention.
Figure 2:
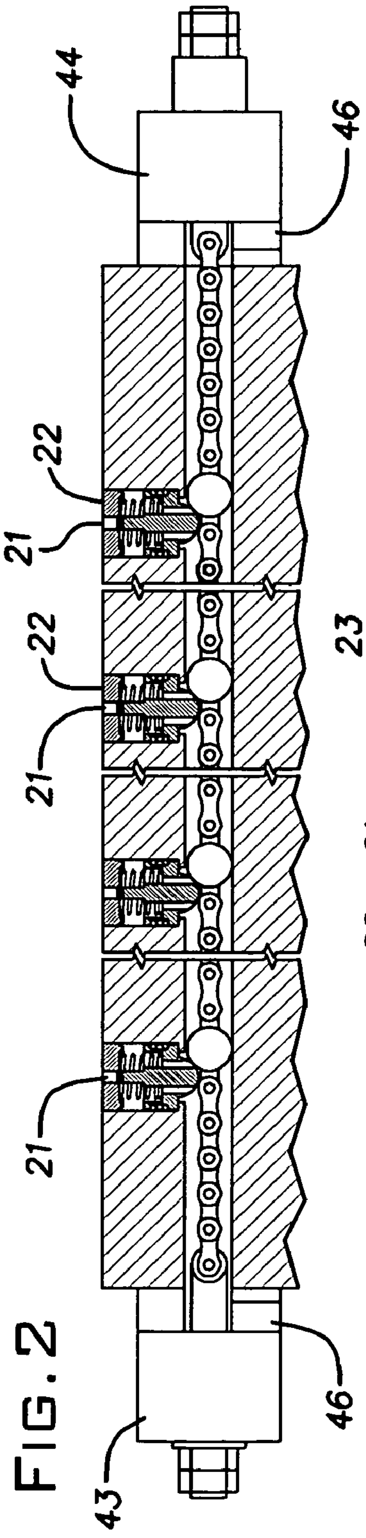
FIG. 2 is an enlarged fragmentary cross-sectional view of the platen of FIG. 1 taken in the plane 2—2 indicated in FIG. 1.
Figure 3:
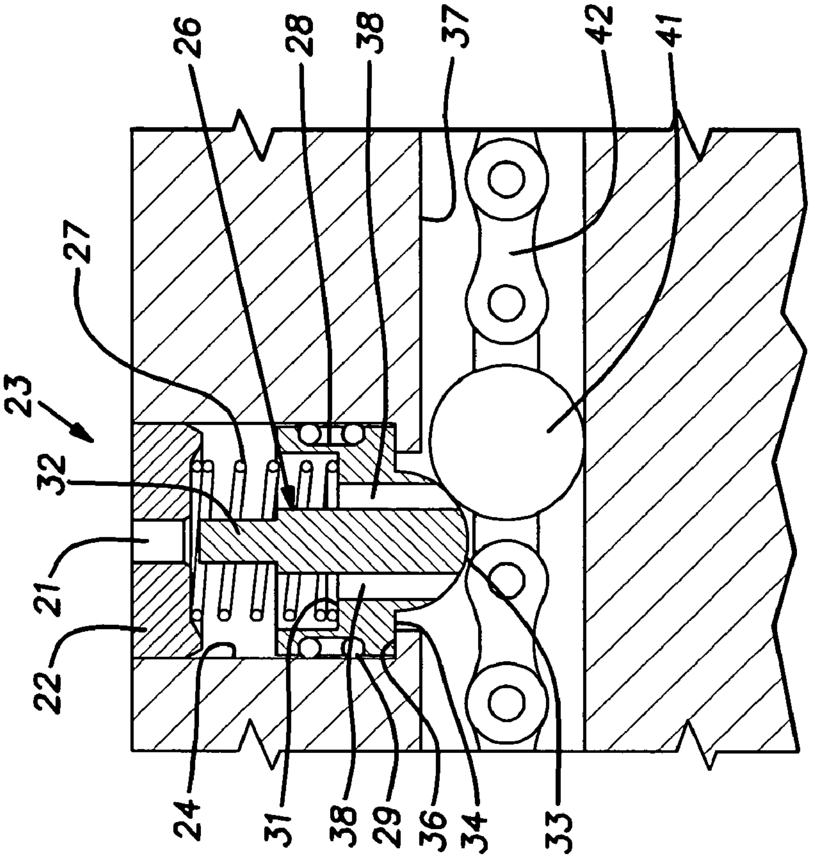
FIG. 3 is a view similar to FIG. 2 except on a larger scale showing details of a typical vent cartridge assembly and associated operating elements
Figure 4:
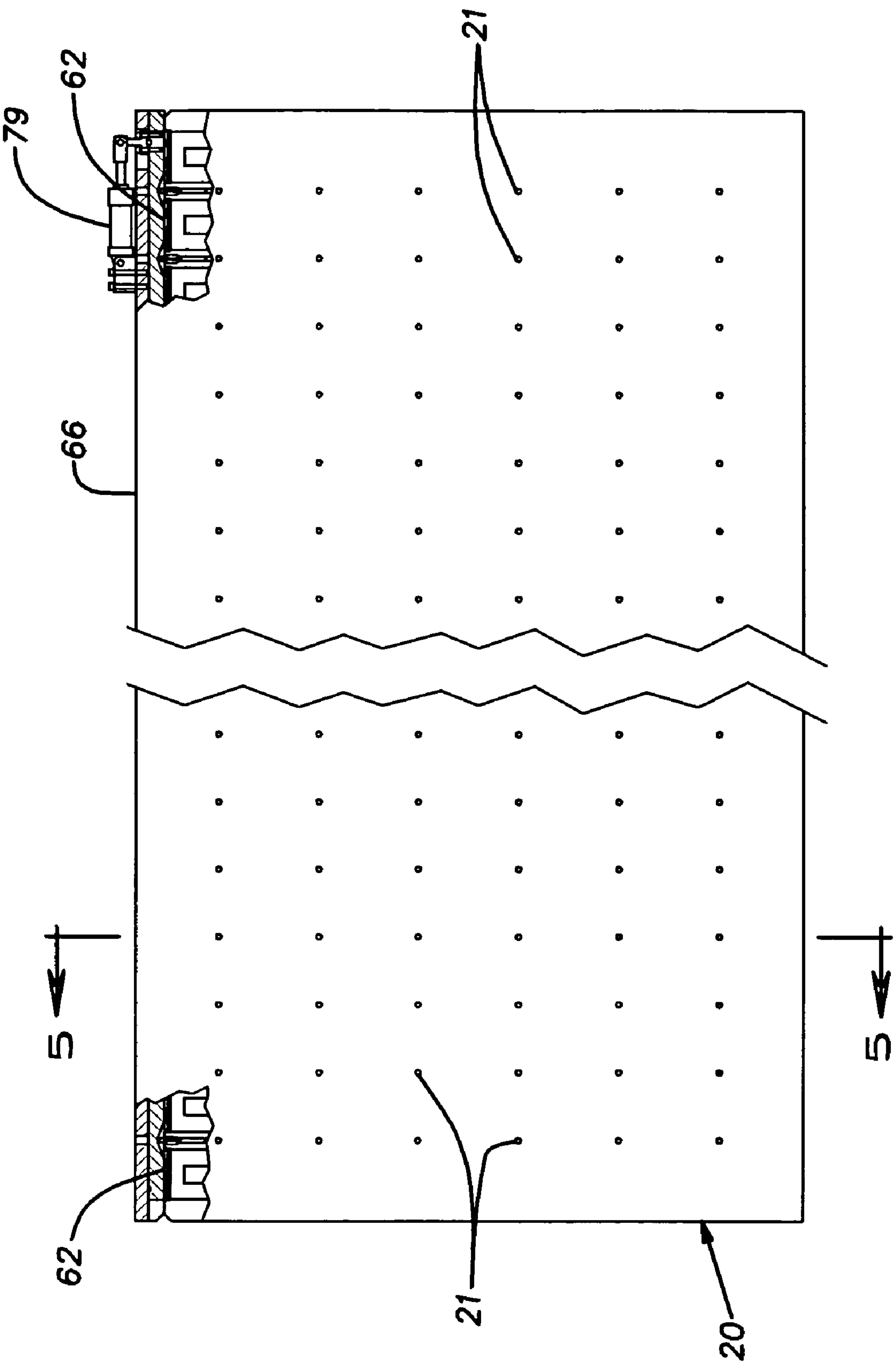
FIG. 4 is a plan view of a platen constructed in accordance with a second embodiment of the invention.

Referring now to FIGS. 1–3 of the drawings, there is shown a first embodiment of a platen 10 constructed in accordance with the invention. The platen 10, which customarily is rectangular in plan view, can range in size from about 4'×4' to about 14'×30'. The platen 10, as is customary, is machined from a solid flat slab of steel. The platen 10 has opposed faces that are ground flat and parallel to one another. One of the faces 11 is shown and typically the opposite face has the same vent hole and self-cleaning pin construction that is described below; the top and bottom plates in a multistage press ordinarily will not have vent holes or cleaning pins at their outside (top and bottom, respectively) faces.

Spaced parallel passages or bores (not shown) are gun drilled from one long edge 16 to the other edge 17 along lines perpendicular to these edges. Where the platen 10 is square, either pair of opposed edges can be considered the long sides or edges. The ends of the passages are interconnected to create a serpentine path for hot oil flow in a known manner to allow the hot oil to heat the platen to an elevated temperature of, for example, 350° F.

In accordance with the invention, an array of spaced vent holes 21 is provided across the area of at least one and, more typically, both faces or pressing surfaces 11 of the platen 10. In the preferred arrangement, vents or holes 21 are arranged in sets with the vents of each set being spaced generally uniformly from one another along a respective common line perpendicular or transverse to the long edges 16, 17 and with these lines being generally uniformly spaced along the length of the platen 10.

FIGS. 2 and 3 show cross-sections of the platen 10 at a typical transverse line of vent holes 21. Each vent hole 21 in a platen surface 11 is formed as a cylindrical hole in the center of a circular plug 22 of a cartridge or assembly 23. The cartridge 23, which is received in a circular bore 24 in the body of the platen 10 perpendicular to the platen surface 11 includes, besides the plug 22, a pin unit 26 and a compression spring 27 disposed between the plug 22 and pin unit 26. The pin unit 26 is a circular body sized to freely move axially in the cylindrical bore 24. An annular peripheral groove 28 on the pin unit 26 receives a linear ball bearing assembly 29 that reduces friction between the wall surface of the bore 24 and the pin unit 26 thereby facilitating axial motion of the pin unit in the bore. An annular groove 31, formed in the pin unit 26 on a side facing the plug 22, receives a portion of the length of the compression spring 27 such that the end of the spring abuts the bottom of the groove. The opposite end of the spring 27 abuts an inner face of the plug 22. A cylindrical pin 32 sized to move in and out of the vent hole 21 is formed as a central axially extending projection of the main body of the pin unit 26. The length of the pin 32 is preferably at least as great as the length of the vent hole 21.

An inner end of the pin unit 26 has a convex, preferably hemispherical portion 33 proportioned, when a radial face 34 of the unit abuts an end wall 36 of the bore 24 to extend into a passage in the form of a round bore 37 machined or otherwise formed in the body of the platen 10. A pair of diametrally opposed axially oriented holes 38 extend through the body of the pin unit 26 from the bottom of the annular groove 31 to the exterior of the projection 33.

The cartridge assembly 23 is assembled in the circular bore 24 by first dropping in the pin unit 26, including the bearing assembly 29, and spring 27. The plug 22 is thereafter installed in the bore 24. One preferable method of locking the plug 22 in position is to size it to have an interference fit with the bore and chill it with liquid nitrogen before installing it in the bore. Normally, the surface 11 of the platen is smooth and it is important that the plug 22 fits flush with this surface so that the products being formed by the platen 10 are smooth. Various other methods of securing the plug 22 of the cartridge 23 in place are contemplated. Where the plug is welded in place, the platen and plug can be ground flat after welding. A bore 37 is formed by gun drilling or other suitable process along a line that is parallel to the face 11 and intersects all of the cartridge receiving bores 24 and is thereby common to the vent holes 21 lying on the same transverse line of the vent array.

A cam 41 in the form of a spherical ball, is associated with each of the vent hole cartridges 23. An elongated force transmitting member in the form of a chain 42, such as a conventional roller chain, extends along a respective bore 37 and is fixed to each of the cam balls 41. A force actuator 43, such as a hydraulic pancake cylinder, is connected to one end of the chain 42 and an opposing force actuator 44 such as spring pack or a hydraulic pancake cylinder is connected to the opposite end of the chain on the opposite edge of the platen 10. Each row or transverse line of vent holes 21 has the same construction including cartridge assemblies 23, bores 37, cams 41 and chains 42, and force actuators 43, 44.

The platen 10 is typically used with other identical platens in a multi-stage press where the platens are arranged in a horizontal orientation, one overlying another. Material, in particle, chip, strand, layer or like form and an accompanying thermally responsive binder is laid out on each intermediate upper face of a platen. The press is then closed by forcing the platens together to thereby compress the material into a rigid board. As mentioned, the platens 10 are conventionally heated to an elevated temperature in the range of, for example, about 350° F. with circulating hot oil through the passages 13. The material being pressed, which ordinarily is wood or cellulose-based, typically contains moisture which is converted into steam during the heating and pressing process. The vents 21 allow this steam to escape from the pressing space as it is generated and this exhaust of steam ultimately results in an improved board product. Steam passes through a vent 21 over a pin 32 into the bore 24 and through the axial passages 38 into the transverse bore 37. The cam balls 41 are slightly smaller in diameter than the bore 37 so that steam can flow around the cam balls and along the bore and exhaust through passage 46 at the ends of the bore. Prior attempts to vent a platen surface have had limited success because elements of the board materials driven by steam flow and mechanical pressure would find their way into the vents and through accumulation would plug the vents and render them ineffective. The pins 32 of the cartridge assemblies 23 are arranged to positively mechanically clean out the vent holes 21 and displace any accumulation of board material from these openings. To purge the vents 21 of any accumulation of board material, the pin units 26 are moved from their retracted positions illustrated in FIGS. 2 and 3 where the pins 32 are displaced from the vents 21 to extended positions where the pins project through the associated vents with their outer end faces flush or projecting slightly from the plane of the platen face 11. The pins 32 are forcibly extended by pressuring the associated hydraulic actuator 43 to tension and move the chain 42. Limited chain motion (to the left in FIGS. 2 and 3) causes the cam balls 41 through contact with the projecting hemispherical portions 33 to actuate and cam the respective pin units 26 outwardly such that the pins 32 extend into their associated vent holes 21. The opposing force actuator 44 maintains a level of tension in the chain 42 to avoid any slack so that the cams 41 are registered with the hemispherical cam following portion 33 and returns the chain and cams to the illustrated position when the actuator 43 is depressurized at the end of a vent cleaning cycle. The actuators 43 can be energized when the press is open to clean the vents 21 as frequently as conditions warrant.

Figure 5:
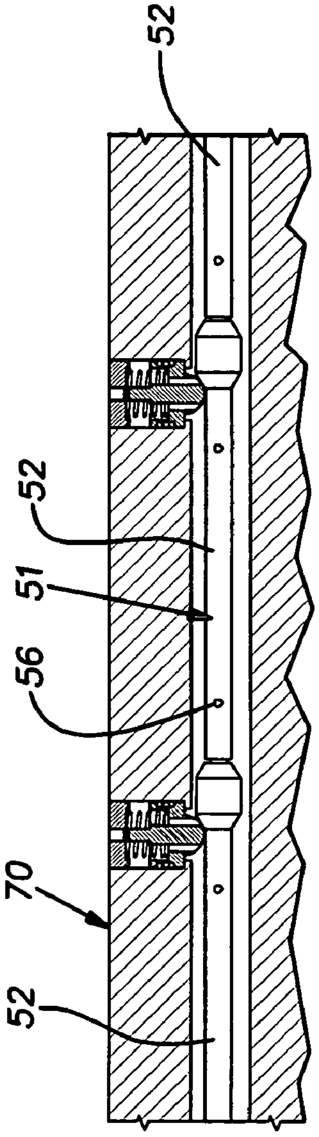
FIG. 5 is an enlarged fragmentary cross-sectional view of the platen of FIG. 4 taken along the plane of lines 5—5 in FIG. 4.
Figure 6:
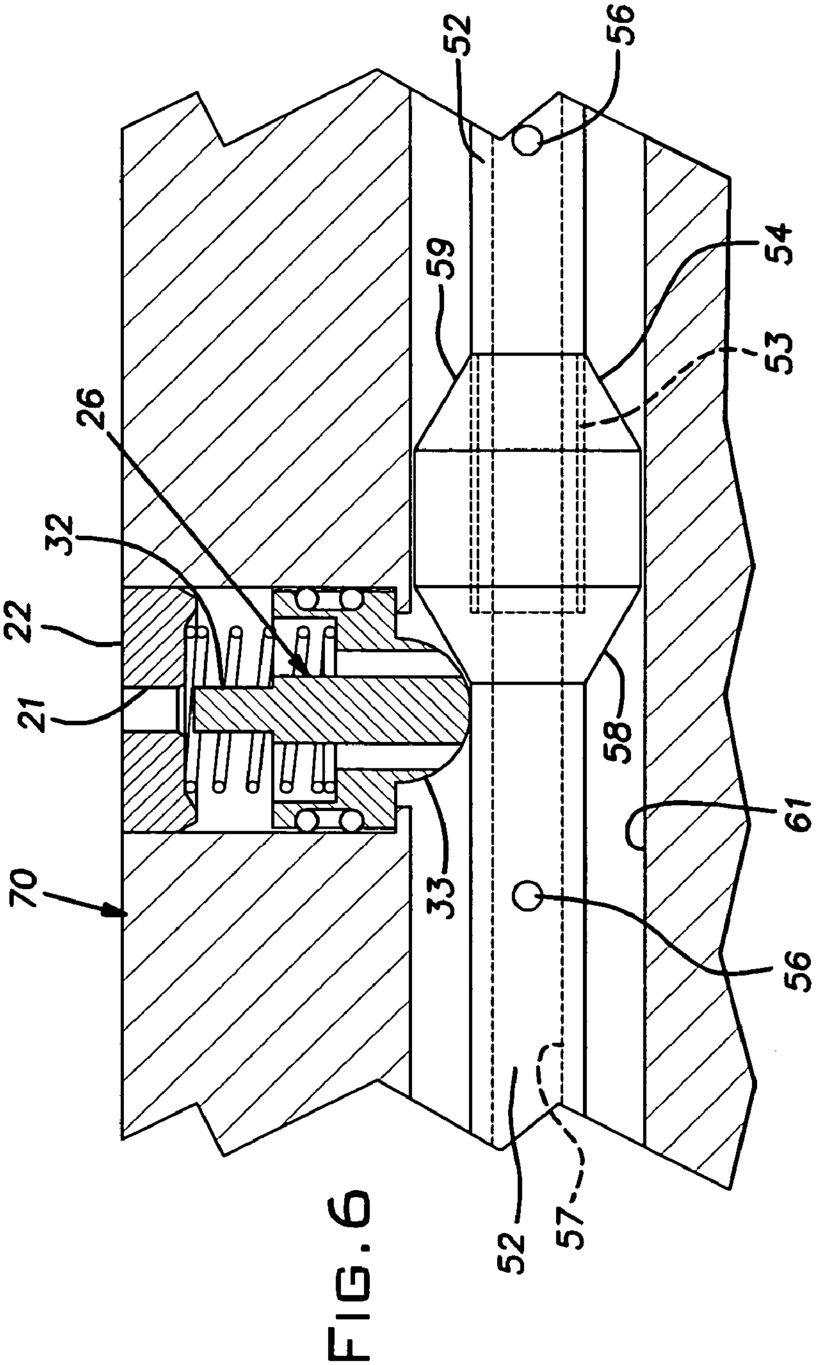
FIG. 6 is a fragmentary cross-sectional view, similar to FIG. 5, of a vent cartridge assembly and associated operating elements.
Figure 7:
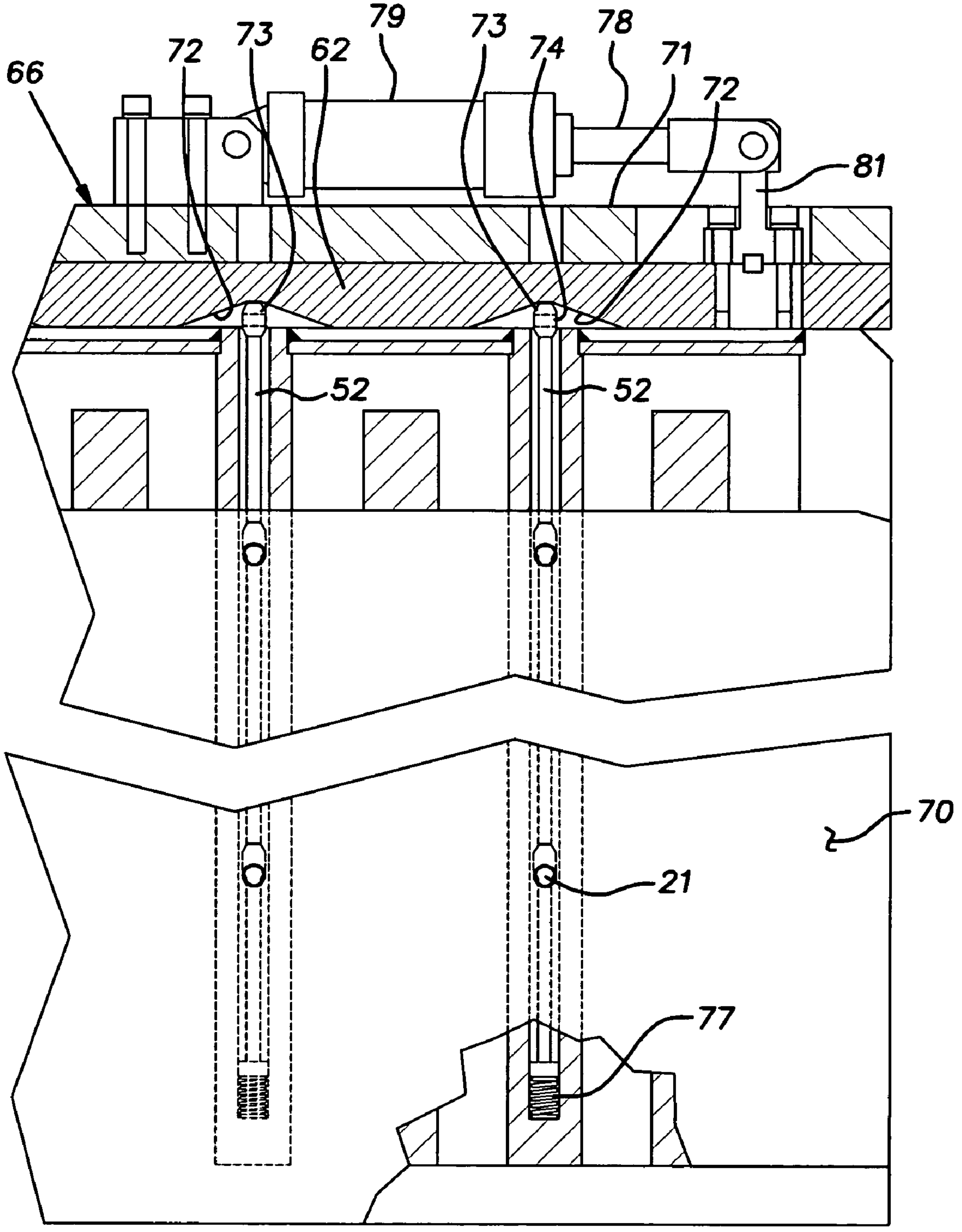
FIG. 7 is an enlarged fragmentary plan view, partially in section, of the platen of FIGS. 4–6.

Referring now to FIGS. 4–7 another embodiment of the invention is shown. An elongated rigid segmented rod 51 replaces the chain 42 of the first embodiment. A typical rod segment 51 is illustrated in FIG. 5 and comprises a round steel tube machined from seamless tubing or otherwise formed into the illustrated round form. At one end, the rod segment 52 has external threads 53 and at the opposite end an enlarged bulb or head 54 with internal threads that are complementary to the external threads 53. Diametral cross holes 56 in the segment 52 communicate with a central bore 57 running through the rod segment 52. Each end of the head 54 is sloped with a conical camming surface 58, 59. The head 54 is sized to slide freely in a transverse passage or round bore 61 (corresponding to the common passage or bore 37 of the earlier described embodiment of FIGS. 1–3). The rod segments 52 are threaded into one another as indicated in FIG. 5. The length of a rod segment 52 is determined so that when it is assembled with the other segments, the heads 54 of adjacent segments are spaced longitudinally from one another by a distance equal to the spacing between the vents 22 along their respective transverse lines.

It will be noted that in this embodiment, the vent holes 21 are provided by cartridge assemblies 23 identical to those described above in connection with FIGS. 1–3.

The platen, designated 70, is heated with hot oil circulating through passages as discussed in connection with the embodiment of FIGS. 1–3. Steam being exhausted through the vent holes 21 is allowed to pass through the cross holes 56 into the central bore 57 of the rod segments. Steam escapes axially through the central bore 57 out through a transverse hole 74 of a cam follower 73 at one end of the rod 51 and ultimately exhausts at the long edge 62 of the platen 70.

The rods 51 are forcibly moved by a cam bar 62 (FIG. 7) that extends along a long edge 66 of the platen 70. The cam bar 62 is constrained by a mounting plate assembly 71 such that it can move only in the longitudinal direction of the platen edge 66. The cam bar 62 includes a cam surface 72 at each of a plurality of locations along its length corresponding to locations of the transverse bores 61. The rod segment 52 adjacent the cam bar 62 has the cam follower 73 fixed on its head 54. The cam follower 73 provides the transverse hole 74 which communicates with a central bore that connects with the axial bore in the segments 52. At the opposite end of each segmented rod 51 is a compression spring 77 that resiliently forcibly biases the rod towards the cam bar 62. The piston rod 78 of an actuator cylinder 79 is connected to the cam bar 62 through a rigid extension 81. When the actuator cylinder 79 is energized, the cam bar 62 is moved longitudinally a short distance (to the left in FIG. 5). At an appropriate time when the press in which the platen 70 is employed is open, the actuator 79 is energized to simultaneously extend all of the vent cleaning pins 32 into their respective vent holes 21. The cam surfaces 72 move their respective segmented rods 51 axially in the bores 61 overcoming the resistance of the springs 77 so that the conical camming surface 58 at each cartridge assembly is caused to actuate and cam the hemispherical portion 33 of the respective pin unit 26 outwardly to drive the hole cleaning pin 32 into its respective vent hole 21.

Figure 8:
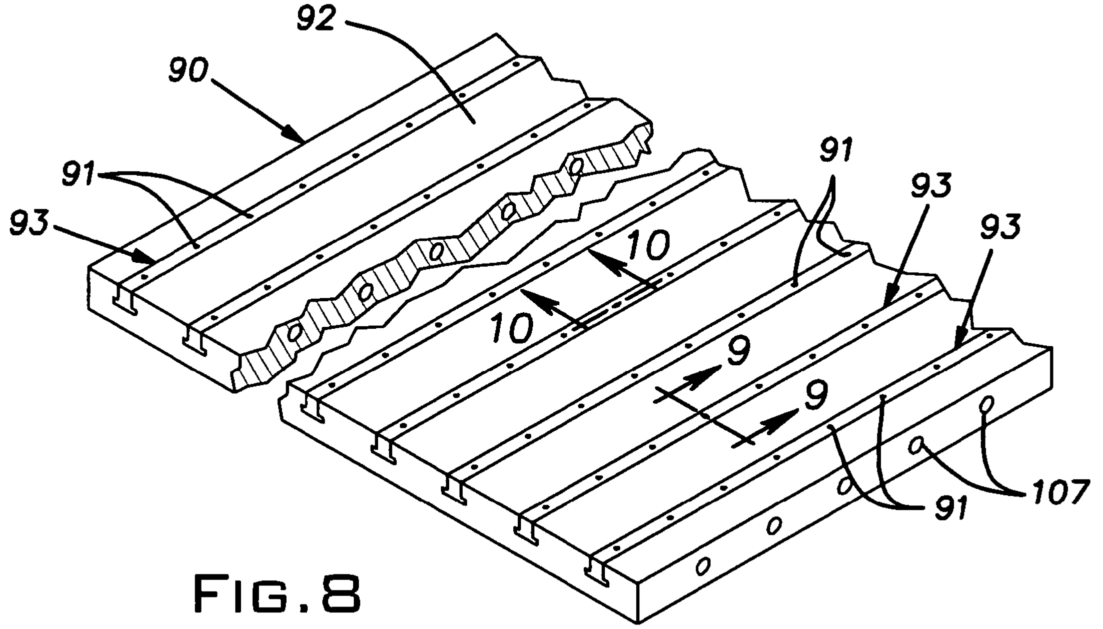
FIG. 8 is a schematic perspective view of a platen constructed in accordance with a third embodiment of the invention.
Figure 9:
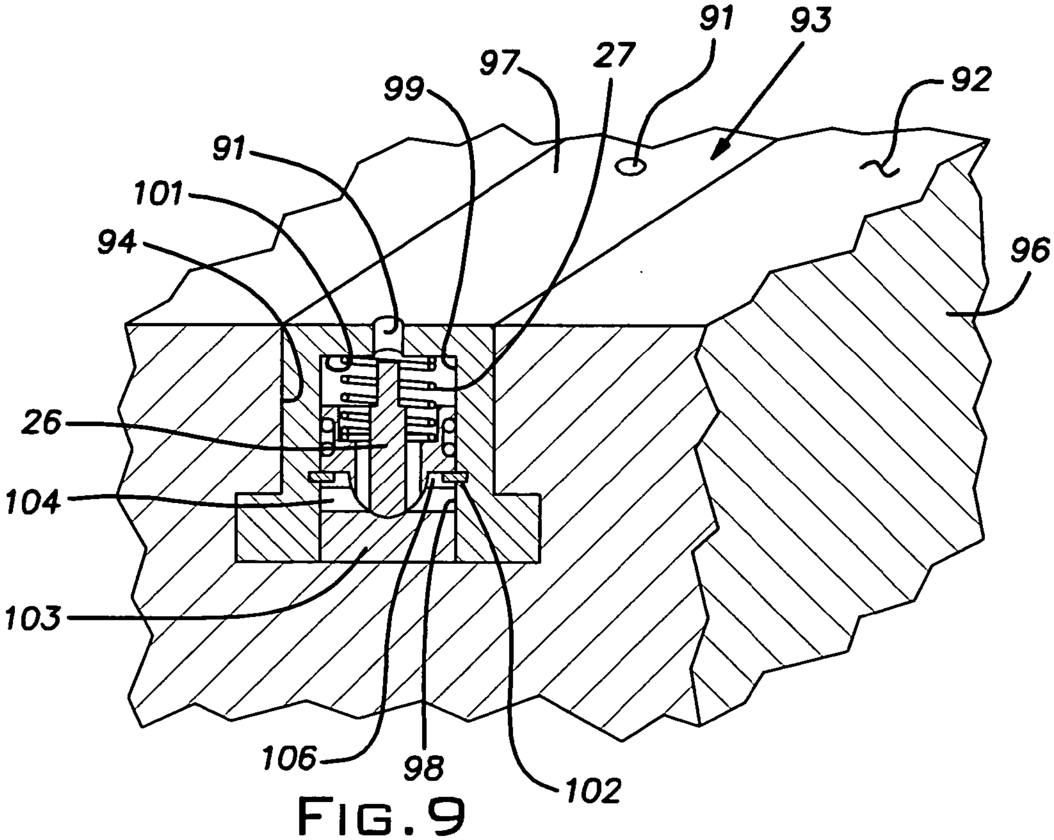
FIG. 9 is a fragmentary cross-sectional isometric view of an area of a typical vent hole taken in the plane indicated by the lines 9—9 in FIG. 8.
Figure 10:
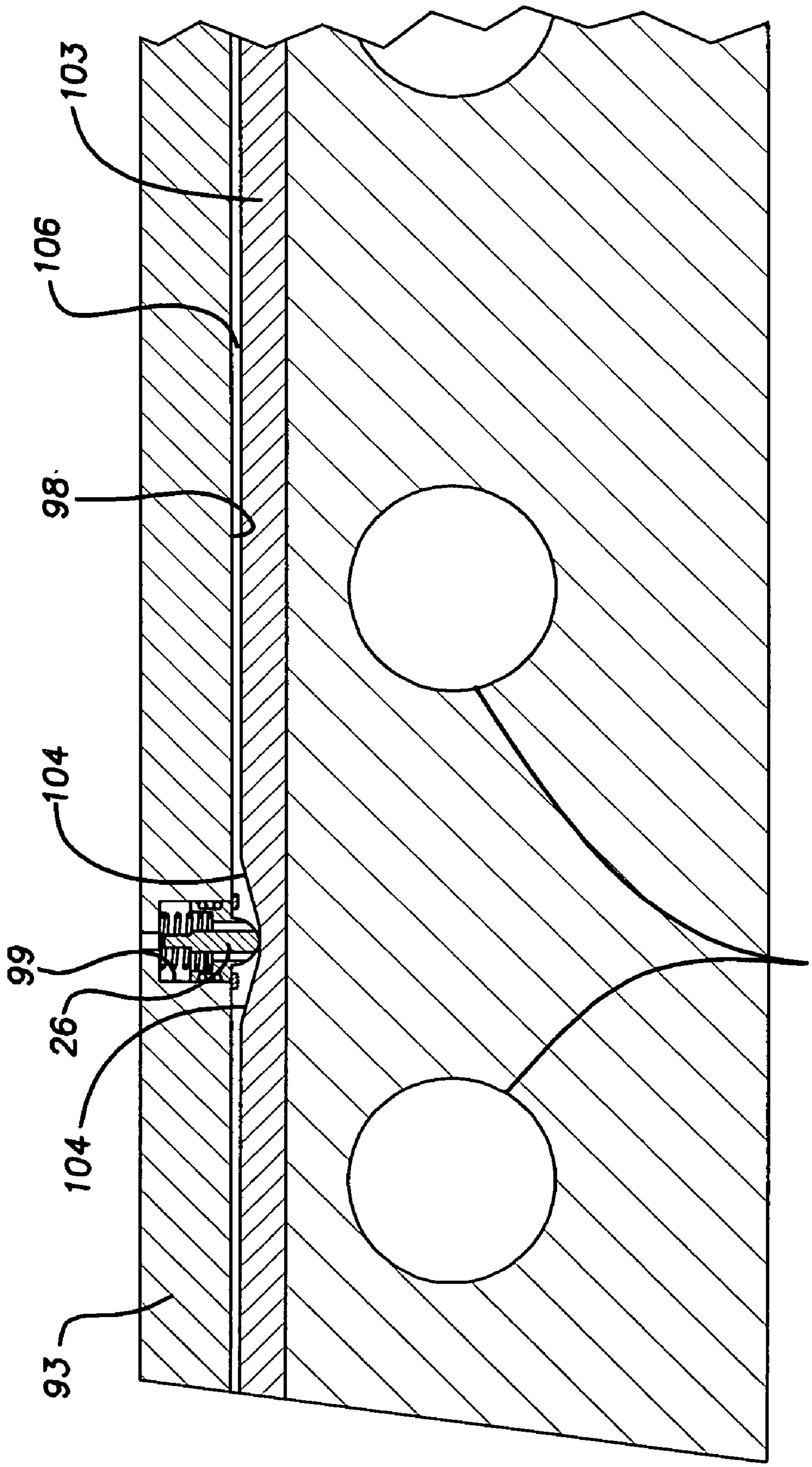
FIG. 10 is a fragmentary cross-sectional view of the platen of FIG. 8 taken in a plane indicated by the lines 10—10 in FIG. 8.

Referring to FIGS. 8–10, there is shown a third embodiment of the invention that comprises a platen 90. The platen 90 has a plurality of vent holes 91 distributed across its pressing surface 92. The vent holes 91 are preferably formed in elongated T-shaped bars 93 received as inserts in open face T-slots 94 milled or otherwise formed in a main body 96 of the platen 90. Preferably, the vent holes 91 are uniformly spaced along the length of a respective T-bar 93 and the slots or grooves 94 are parallel and uniformly spaced from one another across the pressing surface 92. The bars 93 are closely fitted to the geometry of the slots 94 and have their outer surfaces 97 forming part of the pressing surface 92 and being coplanar with the major parts of the pressing surface 92 formed by the main body 96. The bar 93 has a passage in the form of a slot 98 open at its broad face and extending along its full length. As shown, the slot 98 is centered on the plane of symmetry of the T-bar 93. Associated with each vent hole 91 is a hole in the form of a counterbore 99 that extends from the slot 98 to an end wall 101 adjacent the outer pressing surface 97 of the T-bar 93.

A pin unit, which can be identical to the pin unit described above in connection with the earlier discussed embodiments, is indicated by the same reference numeral 26. The pin unit 26 and associated spring 27 are releasably retained in the counterbore 99 by an internal snap ring 102.

Disposed in the passage or slot 98 of each T-bar 93 is an elongated cam bar 103 that extends the length of the T-bar. At regularly spaced locations along its length corresponding to the centers of the vent holes 91, the cam bar 103 includes cam surfaces 104. The cam surfaces 104 are milled or otherwise formed on the bar such that they are inclined at an angle relative to the longitudinal direction of the bar. The cam bar 103 is proportioned to slide freely longitudinally in the slot 98. The linear ball bearing assembly 29 supports the pin unit 26 for axial movement in the counterbore 99.

Each cam bar 103 with its cam surfaces serves like the cam balls 41 and chain 42 of the first embodiment, and the conical camming surfaces 58 and segmented rod 51 in the second embodiment to extend the pins 32 into their respective vent holes 91 at appropriate times in the operation of a press in which the platen 90 is used. A hydraulic or other known type of actuator, like the actuator 79, can be used to simultaneously operate all of the cam bars 103 through a common drive analogous to the cam bar 62 or individual actuators can be connected to each of the cam bars 103 like the arrangement of the actuators 43 of the first described embodiment. In either case, the power actuator or actuators is/are mounted on the platen 90.

As in the earlier described embodiments, steam generated by the pressing process is exhausted through the vent holes 91, the pin unit bores 38 and along a clearance space 106 between the cam bar 103 and the passage or slot 98 to the edges of the platen body 96 where it is discharged to the atmosphere. Each of the T-bars 93 can be removed from the main body 96 by sliding it longitudinally out of its respective slot 94. Removal of a T-bar 93 enables the pin unit 26 and parts associated with it to be maintained and/or replaced as needed.

Hot oil or steam circulates through passages 107 in the platen body to heat the platen 90 to an operating temperature. The vent holes, pin units and operating elements for the pin units, as described, are typically provided on both pressing surfaces of the platen 90.

Figure 11:
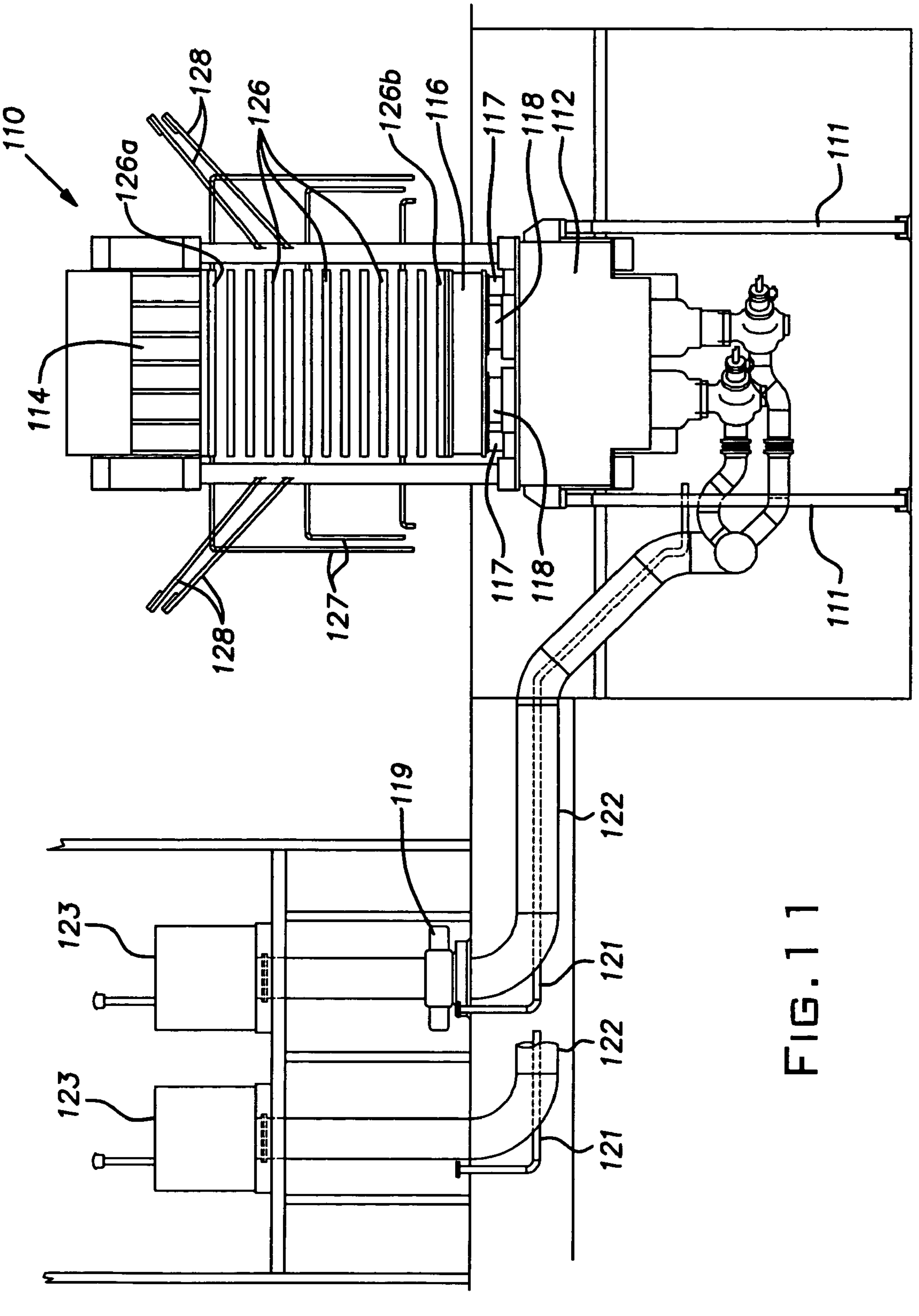
FIG. 11 schematically illustrates an example of a multi-opening press in elevational view, looking downstream.

FIG. 11 illustrates a multi-opening or multi-platen press embodying the invention. The press includes a plurality of columns 111 that support the press through a bottom bolster 112. Vertical tie rods 113 extend between the bottom bolster 112 and a crown 114. A main platen 116 is moved upwardly by jack cylinders 117 in the initial closing movement of the press, and by hydraulic main ram cylinders 118 during high pressure compression operation of the press. The cylinders 117, 118, are operated by hydraulic oil pressurized by electrically driven pumps 119 and supplied under pressure from the pumps through lines 121 and exhausted through lines 122. Hydraulic oil is supplied from and received by reservoirs 123.

A series of horizontal platens 126, 126*a,* and 126*b,* representing one of the styles of the platens 10, 70, or 90 disclosed above, are arranged in a vertical stack one above the other. The top and bottom platens 126*a* and 126*b* typically will have vent holes as described hereinabove on their lower and upper pressing surfaces, respectively, while the remaining platens 126 are provided with vent holes on both pressing faces. Pipes 127 convey heated oil or steam to the platens 126 as described. Hydraulic lines, not shown, connect to the actuators 43 or 79 on the individual platens 126. Pivotal closing arms 128 in a manner known in the art maintain the platens 126 in parallel horizontal alignment.

Loose material to be pressed into panels is conveyed onto the top surface of each of the platens 126. The jack cylinders 117 are actuated with pressurized hydraulic fluid to raise the main platen 116 and close the openings between platens 126. Thereafter, the main ram cylinders 118 are pressurized to compress the board material to the requisite pressure. The vent holes in the pressing surfaces of the platens 126 enable the press 110 to compress the board material without the need to decompress this material by backing off the platens 116, 126 to allow the steam being generated from moisture contained in the board material to escape without an explosive effect. By eliminating the need for decompression or backing off of the platens to allow steam to be released, the vent holes can reduce the molding cycle time by about 20% to thereby increase the productivity of the press. This decrease in cycle time is of great significance in the return on investment in the cost of the press 110. Besides significantly improving productivity, the vent holes of the platens 126 enable the press 110 to produce an improved board product with greater uniformity and with far less rejected material that otherwise occurs when steam is not properly released in prior art presses.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A platen for pressing material such as wood chips or the like into rigid boards comprising a flat steel body with a thickness defined by the distance between oppositely facing surfaces parallel to one another and including at least one pressing surface, a plurality of vent holes, small in comparison to the area of the pressing surface, distributed in spaced relation across the area of the pressing surface, a plurality of vent hole cleaning pins within the thickness of the body, each pin being associated with one of the vent holes, the pins having portions sized to enter and clean said vent holes, actuator mechanism to move said pins between a retracted position and an extended position, said pins in said extended position being capable of displacing residuals of the material being pressed that have entered said vent holes and in said retracted position enabling vapor from the material being pressed to be exhausted through said vent holes, said actuator mechanism, within the boundary of said pressing surface area, lies exclusively within the thickness of the platen body.

2. A platen as set forth in claim 1, wherein the platen pressing surface is rectangular, said vent holes being arranged in sets, the vent holes of each set being spaced along an associated one of a plurality of parallel lines perpendicular to a common edge of the platen.

3. A platen as set forth in claim 2, wherein said vent holes of a set are generally uniformly spaced along the respective line and said lines are generally uniformly spaced from one another.

4. A platen as set forth in claim 2, wherein said actuator mechanism includes cam elements associated with each of said pins.

5. A platen as set forth in claim 4, wherein said pins operate in respective holes associated with their respective vent holes, the holes of a set of pins communicating with a common passage in the platen body parallel to a line of said set, the pins in their retracted position and the configuration of the respective holes allowing vapor to enter the vent holes and be discharged through said common passages.

6. A platen as set forth in claim 5, wherein said cam elements are disposed in said common passages.

7. A platen as set forth in claim 6, wherein said cam elements are responsive to forces transmitted along said common passages.

8. A platen as set forth in claim 7, wherein said forces are transmitted in the direction parallel to said common passages.

9. A platen as set forth in claim 7, wherein said cam elements in a common passage are operated by a common actuator.

10. A platen as set forth in claim 7, wherein all of said cam elements are operated by a common actuator.

11. A platen as set forth in claim 7, wherein said cam elements in a common passage are interconnected by tensile force transmitting elements.

12. A platen as set forth in claim 8, wherein the transmitting elements are links of chain.

13. A platen as set forth in claim 12, wherein said force transmitting elements comprise a series of links of roller chain between adjacent ones of said vents.

14. A platen as set forth in claim 7, including force transmitting elements comprising a compression rod having cam elements fixed along its length at spaces equal to the distance between adjacent vents.

15. A platen as set forth in claim 4, wherein said pins each have a compression spring biasing the pin to its retracted position.

16. A platen as set forth in claim 5, wherein the vent holes lying along a common line are formed in a common removable insert received in an open-faced slot in a main body of the platen.

17. A platen as set forth in claim 16, wherein said insert is configured to allow steam received in said vent holes to escape along a passage in said body closed by said insert.

18. A platen as set forth in claim 17, wherein an elongated pin operating bar is received in each of said slots, each pin operating bar including a cam surface adjacent each of the vent holes associated with the respective insert.

19. A multi-opening press including a bottom bolster and a crown joined by a plurality of tie rods, a main platen above the bottom bolster, hydraulic cylinders to move the main platen towards the crown, a series of pressing platens arranged one above the other in a vertical column between the tie rods above the main platen and below the crown, the pressing platens being arranged to be heated to an elevated temperature, the hydraulic cylinders compressing material originally conveyed onto the upper surfaces of the pressing platens, the surfaces of the pressing platens having vent holes distributed across their pressing area, the vent holes being capable of receiving steam produced from moisture in the material being pressed between the pressing platens.

20. A multi-opening press as set forth in claim 19, wherein each of the pressing platens includes self-cleaning pin elements for periodically cleaning said vent holes.

21. A multi-opening press as set forth in claim 20, wherein said pin elements for each pressing platen are contained within the thickness of the pressing platen.

22. A multi-opening press as set forth in claim 21, wherein an actuator for extending said pin elements into said vent holes is mounted on the respective pressing platen.

* * * * *